(12) United States Patent
Voruganti et al.

(10) Patent No.: US 9,054,996 B2
(45) Date of Patent: Jun. 9, 2015

(54) DYNAMIC PRIORITIZED FAIR SHARE SCHEDULING SCHEME IN OVER-SUBSCRIBED PORT SCENARIO

(75) Inventors: Sreenivas Voruganti, Bangalore (IN); Sainath Cheruvu, Ananthapur (IN); Ganesh Rajagopalan, Chennai (IN); Rahul Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 951 days.

(21) Appl. No.: 12/647,048

(22) Filed: Dec. 24, 2009

(65) Prior Publication Data

US 2011/0158248 A1 Jun. 30, 2011

(51) Int. Cl.
*H04L 12/931* (2013.01)
*H04L 12/801* (2013.01)
*H04L 12/813* (2013.01)
*H04L 12/835* (2013.01)

(52) U.S. Cl.
CPC ............. *H04L 49/505* (2013.01); *H04L 49/506* (2013.01); *H04L 47/12* (2013.01); *H04L 47/20* (2013.01); *H04L 47/29* (2013.01); *H04L 47/30* (2013.01)

(58) Field of Classification Search
CPC ....... H04L 47/12; H04L 47/20; H04L 49/505; H04L 49/506; H04L 47/30; H04L 47/22; H04L 47/29

USPC .................................................. 370/235, 412
See application file for complete search history.

(56) References Cited

U.S. PATENT DOCUMENTS

| 7,599,292 | B1 * | 10/2009 | Gupta et al. | 370/235 |
| 2007/0263640 | A1 * | 11/2007 | Finn | 370/401 |
| 2008/0298263 | A1 * | 12/2008 | Yamada et al. | 370/252 |
| 2009/0113071 | A1 * | 4/2009 | Kotrla et al. | 709/242 |
| 2012/0127862 | A1 * | 5/2012 | Madsen et al. | 370/235 |
| 2014/0029936 | A1 * | 1/2014 | Kramer et al. | 398/25 |

* cited by examiner

*Primary Examiner* — Man Phan
*Assistant Examiner* — Mandish Randhawa
(74) *Attorney, Agent, or Firm* — Harrity & Harrity, LLP

(57) ABSTRACT

A network device receives initial policer limits for a plurality of over-subscribing ingress ports, where the initial policer limits are based on existing bandwidth limits for an over-subscribed egress port associated with the over-subscribing ingress ports. The network device receives a high threshold watermark and a low threshold watermark for bandwidth usage of the over-subscribed egress port, and identifies a queue, associated with the over-subscribed egress port, with values outside the high threshold watermark or the low threshold watermark. The network device reduces the initial policer limits for the plurality of over-subscribing ingress ports when the queue has values above the high threshold watermark, and increases the initial policer limits for the plurality of over-subscribing ingress ports when the queue has values below the low threshold watermark.

20 Claims, 7 Drawing Sheets

DYNAMIC PRIORITIZED FAIR SHARE SCHEDULING SCHEME IN OVER-SUBSCRIBED PORT SCENARIO

BACKGROUND

In an increasingly networked world, more and more traffic, such as data, voice, and video, is transmitted over public and proprietary networks. When routing traffic through the network, it is desirable to be able to assign different types of traffic different priorities as the traffic traverses the network. Some applications require stringent limits on end-to-end traffic delay while other applications require minimal bandwidth guarantees. For example, because streaming video and voice data, when it is delayed, can result in a noticeable degradation in quality to the end-user, it may be desirable to assign this type of traffic a higher priority than other traffic.

In Internet Protocol (IP) packet-based networks, network devices (e.g., routers, switches, etc.) may handle the transmission of the packets through the network. Packets belonging to different traffic classes may be given different priorities by the network devices. The network devices may allocate network resources (such as bandwidth) to the traffic classes based on predetermined bandwidth allocation policies. For example, within the network device, packets of different traffic classes that are routed to the same output port may share the link resources of the output port. In some cases, an output port may be intentionally over-subscribed to maximize available resources. When the incoming traffic data rate exceeds the output port link capacity, the packets may be buffered and the bandwidth allocation policies applied.

A scheduler may control the dequeuing of packets from the buffer queues. In case of an over-subscribed port scenario (e.g., traffic from multiple ingress ports feeding into single output port), a single ingress port/queue can monopolize the output port's available bandwidth. The packet scheduler may be configured to ensure ratios between the queues on the over-subscribed port. However the packet scheduler will not provide fair share/priority among the traffic feeding into queues of the over-subscribed port.

Storm control configuration in case of over-subscribed port scenario also presents a unique configuration challenge. A storm is generated when messages are broadcast on a network and each message prompts a receiving node (e.g., network device) to respond by broadcasting its own messages on the network. This, in turn, prompts further responses, creating a snowball effect and resulting in a broadcast storm that can cause network outages. If the configuration on the over-subscribed port is same as the over-subscribing port, aggressive unknown unicast messages from one source could potentially starve off all other sources of unknown unicast, broadcast, and/or multicast traffic leading the situation where the mechanism to control storms is itself contributing to a denial-of-service (DOS) attack.

SUMMARY

According to one implementation, a network-device-implemented method may include receiving, by the network device, initial policer limits for a plurality of over-subscribing ingress ports, where the initial policer limits are based on existing bandwidth limits for an over-subscribed egress port associated with the over-subscribing ingress ports; obtaining a high threshold watermark and a low threshold watermark for bandwidth usage of the over-subscribed egress port; identifying a queue, associated with the over-subscribed egress port, having a queue volume outside the high threshold watermark or the low threshold watermark; when the queue associated with the over-subscribed egress port has a queue volume above the high threshold watermark, reducing the initial policer limits for the plurality of the over-subscribing ingress ports; and when the queue associated with the egress port has a queue volume below the low threshold watermark, increasing the initial policer limits for the plurality of the over-subscribing ingress ports.

According to another implementation, a network-device-implemented method may include receiving, by the network device, initial storm control limits for a plurality of over-subscribing ports; configuring, by the network device, an initial storm control limit for an over-subscribed port associated with the over-subscribing port, where the initial storm control limit for the over-subscribed port is based on a highest value of the storm control limits for the plurality of over-subscribing ports; establishing a high threshold watermark and a low threshold watermark for storms of the over-subscribed port; identifying storm values, associated with the over-subscribed port, outside the high threshold watermark or the low threshold watermark; when the storm values associated with the over-subscribed port are above the high threshold watermark, reducing the initial storm control limits for the plurality of over-subscribing ports; and when the storm values associated with the over-subscribed port are below the high threshold watermark, increasing the initial storm control limits for the plurality of over-subscribing ports.

According to a further implementation, a network device may include a memory to store a plurality of instructions, and a processor to execute instructions in the memory to: receive policer limits for a plurality of over-subscribing ingress ports, where the policer limits are based on existing bandwidth limits for an over-subscribed egress port associated with the over-subscribing ingress ports; monitor a plurality of queues, associated with the over-subscribed egress port, for queue volumes outside a high threshold watermark for bandwidth usage or a low threshold watermark for bandwidth usage; reduce the policer limits for the plurality of over-subscribing ingress ports, when the one of the plurality of queues has a queue volume above the high threshold watermark; and increase the policer limits for the plurality of over-subscribing ingress ports, when the one of the plurality of queues has a queue volume below the low threshold watermark.

According to a still another implementation, a network device may include a memory to store a plurality of instructions, and a processor to execute instructions in the memory to: receive initial storm control limits for a plurality of over-subscribing ports; configuring an initial storm control limit for a over-subscribed port associated with the over-subscribing port, where the initial storm control limit for the over-subscribed port is based on a highest value of the storm control limits for the plurality of over-subscribing ports; establish a high threshold watermark and a low threshold watermark for storms of the over-subscribed port; identify storm values, associated with the over-subscribed port, outside the high threshold watermark or the low threshold watermark; reduce the initial storm control limits for the plurality of over-subscribing ports when the storm values associated with the over-subscribed port are above the high threshold watermark; and increase the initial storm control limits for the plurality of over-subscribing ports when the storm values associated with the over-subscribed port are below the high threshold watermark.

According to yet another implementation, a network device may include means for receiving initial flow rate control limits for a plurality of over-subscribing ingress ports; means for identifying a high threshold watermark and a low threshold watermark for bandwidth usage of an over-subscribed ingress port associated with the plurality of over-subscribing ingress ports; means for monitoring bandwidth usage of the oversubscribed ingress port; means for identifying, based on the monitoring, bandwidth usage of the oversubscribed ingress port that is outside a range defined by the high threshold watermark or the low threshold watermark; means for reducing the initial flow rate control limits for the plurality of over-subscribing ingress ports when the bandwidth usage of the oversubscribed ingress port is above the high threshold watermark; and means for increasing the initial flow rate control limits for the plurality of over-subscribing ingress ports when the bandwidth usage of the oversubscribed ingress port is below the low threshold watermark.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following description does not limit the invention.

The term "packet," as used herein, may refer to a packet, a datagram, a frame, or a cell; a fragment of a packet, a fragment of a datagram, a fragment of a frame, a fragment of a cell; or another type, arrangement, or packaging of data.

Implementations described herein may include systems and/or methods that provide feedback control within an over-subscribed port arrangement to prioritize fair-sharing among the competing ports, queues, flows, etc. and/or to manage storm control for the over-subscribed port(s). Rate control mechanisms (e.g., rate-limiters, policers, storm controls, etc.) may be used to implement a closed loop feedback control system to ensure a minimum fair share for each competing queue based on priority and to ensure that storm controls provide effective limits. Furthermore, such feedback control may remove conventional restrictions for all the over-subscribing ports to have the same storm control configurations.

Exemplary System Overview

Figure 1:
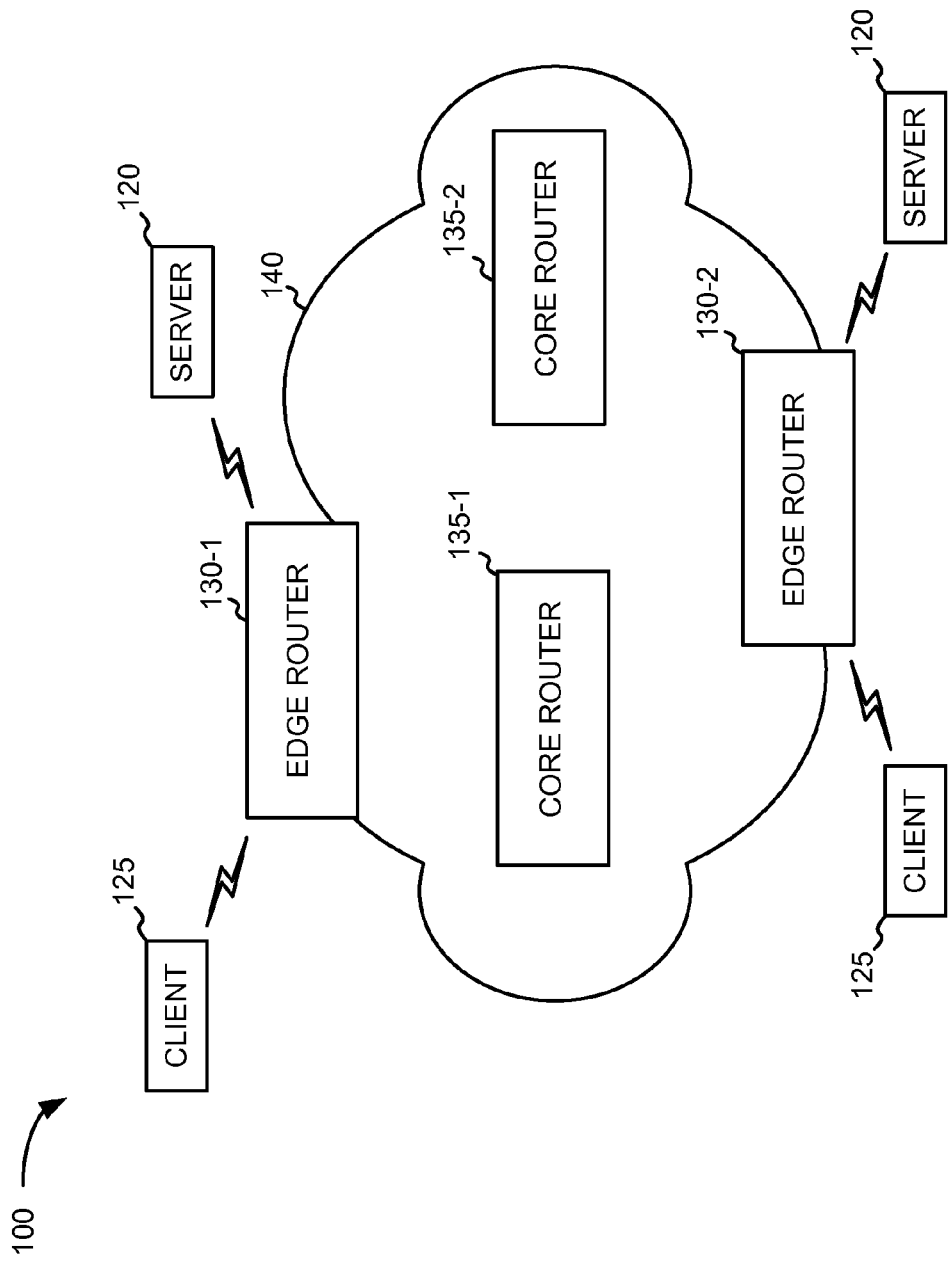
FIG. 1 is a diagram of an exemplary environment in which concepts described herein may be implemented.

FIG. 1 is a diagram of an exemplary environment 100 in which concepts described herein may be implemented. Environment 100 may include multiple entities, such as one or more servers 120 and one or more clients 125. Servers 120 may include one or more computing devices designed to provide information or to otherwise interact with clients 125. Similarly, clients 125 may each include one or more computing devices designed to interact with and obtain content from servers 120 or with other clients 125.

Servers 120 and clients 125 and may communicate via a network 140. Network 140 may include a wide area network (WAN), such as the Internet, a private WAN, or a combination of the Internet and a private WAN, that is used to transport data to servers 120 and clients 125.

Network 140 may include a number of network devices, such as edge routers 130-1 and 130-2, and core routers 135-1 and 135-2. Edge routers 130 may generally function to connect devices, such as clients 125 or servers 120 to network 140. Core routers 135 may function to transmit data between other routers within network 140. In addition to simply routing data, edge routers 130 and core routers 135 may support other "value added" functions, such as quality of service (QoS) features and specialized security functions, such as IPsec (IP security) encryption. In these situations one or more of core routers 135 and/or edge routers 130 may be configured to satisfy a traffic contract in which a minimum QoS is guaranteed for packets within a specified flow or stream.

Although, FIG. 1 illustrates exemplary components of environment 100, in other implementations, environment 100 may include additional, fewer, different, or differently arranged components than those illustrated in FIG. 1 and described herein. For example, although described in the context of edge routers 130 and core routers 135, it should be understood that in other implementations, other network devices may be included in environment 100. Other network devices may include, for example, a gateway, a switch, a firewall, a network interface card (NIC), a hub, a bridge, a proxy server, or an optical add-drop multiplexer (OADM). Additionally, although network 140 is primarily described herein as an IP-based network, network 140 could also be an ATM-based network, a frame relay-based network, or a combination of such networks.

Exemplary Network Device Architecture

Figure 2:
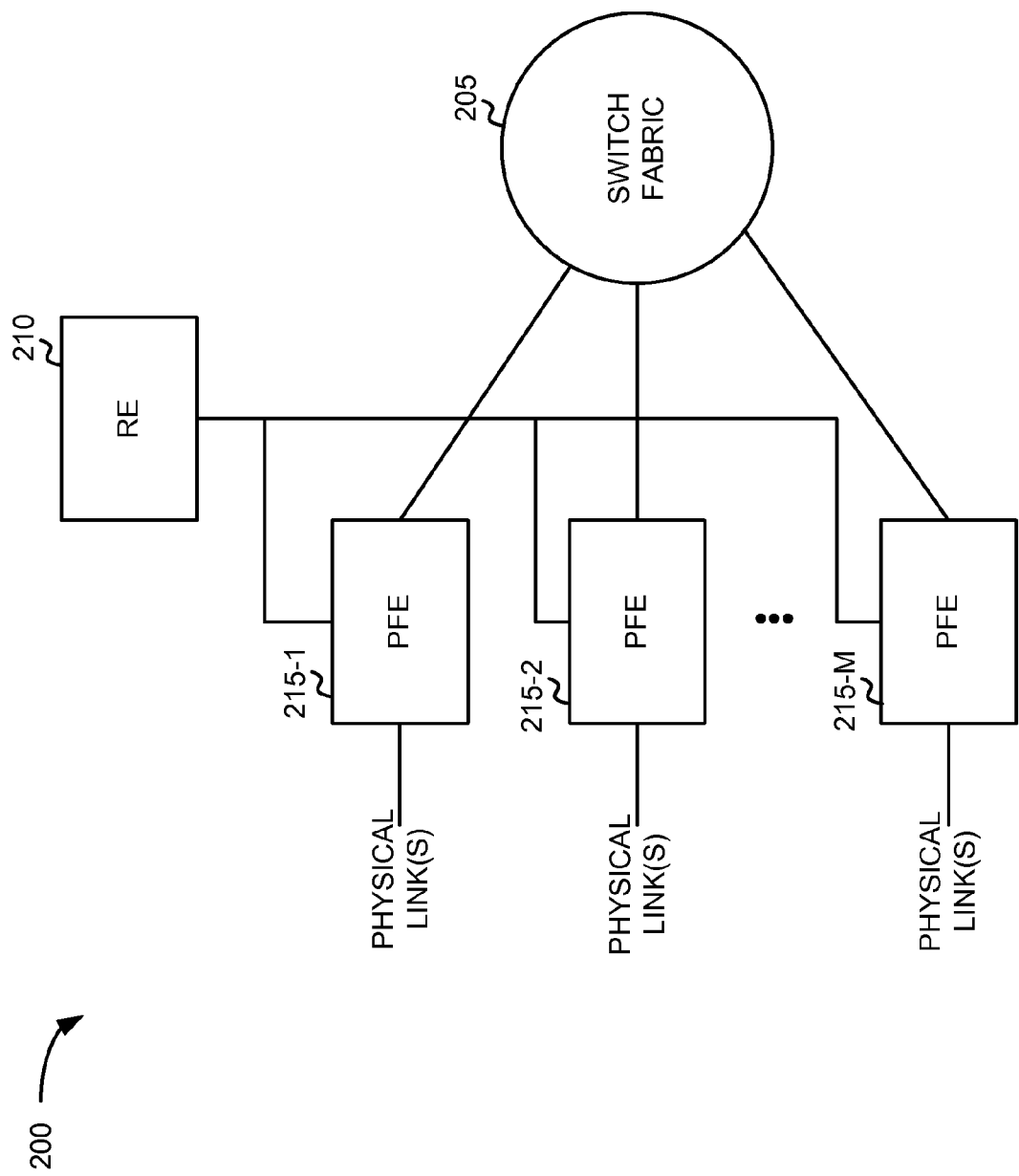
FIG. 2 is a block diagram illustrating a high-level exemplary implementation of one of the network devices shown in FIG. 1.

FIG. 2 is a diagram illustrating exemplary components of a network device 200. Network device 200 may correspond to, for example, one or more of edge routers 130 or core routers 135. As illustrated in FIG. 2, network device 200 may include an internal switch fabric 205, a routing engine (RE) 210, and packet forwarding engines (PFEs) 215-1 through 215-M (collectively referred to as PFEs 215). Network device 200 may receive data from physical links, process the data to determine destination information, and transmit the data out on a link in accordance with the destination information.

RE 210 may perform high level management functions for network device 200. For example, RE 210 may communicate with other networks and systems connected to network device 200 to exchange information regarding network topology. RE 210 may create routing tables based on the network topology information and forward the routing tables to PFEs 215. PFEs 215 may use the routing tables to perform route lookup for incoming data. RE 210 may also perform other general control and monitoring functions for network device 200.

PFEs 215 may each connect to each other via switch fabric 205. Switch fabric 205 may provide internal links between different PFEs 215. In general, PFEs 215 may receive data on ports connecting physical links that lead to network 140. Each physical link could be one of many types of transport media, such as optical fiber or Ethernet cable. The data on the physical link may be formatted according to one of several protocols, such as the synchronous optical network (SONET) standard. PFEs 215 may process the received data, determine the correct output port for the data, and transmit the data on the physical link corresponding to the determined output port.

Although network device 200 is described above as corresponding to an edge router 130 or core router 135, in other implementations, network device 200 may generally be implemented as a router or switch that performs other functions in network 140. Network device 200 may also potentially be implemented as a device installed locally at a location of client 125 or server 120.

Packets traversing a network, such as network 140, may be assigned to various priority classes and then allocated bandwidth differently based on the priority classes. For IP packets, the IP header portion of the packet may be set to indicate the priority level of the packet. Network device 200 may analyze the IP header portion of the packet to determine the priority for a packet. For example, the header of a packet may contain a Type of Service (TOS) field that includes bits that may be based on the priority level of the packet.

Although FIG. 2 illustrates exemplary components of network device 200, in other implementations, network device 200 may include additional, fewer, different, or differently arranged components than those illustrated in FIG. 2 and described herein. Additionally, or alternatively, one or more operations described as being performed by a particular component of network device 200 may be performed by one or more other components, in addition to or instead of the particular component.

Exemplary Over-Subscription Configuration

Figure 3:
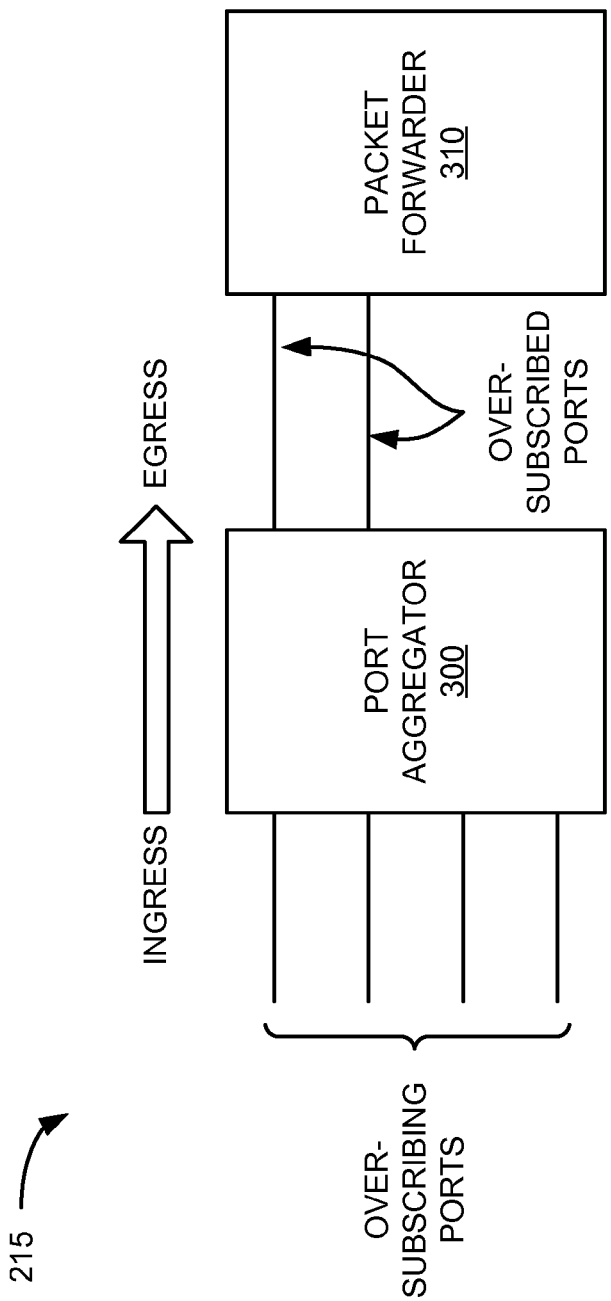
FIG. 3 is a diagram illustrating exemplary functional components of a packet forwarding engine depicted in FIG. 2.

Aspects described herein provide for dynamic prioritized fair-share scheduling and/or dynamic storm control in an over-subscribed port environment. FIG. 3 is a diagram illustrating exemplary over-subscribed components of network device 200. In practice, the elements shown in FIG. 3 may be implemented in, for example, PFE 215 of router 130/135. The functional components illustrated in FIG. 3 may be implemented by hardware (e.g., one or more processors or other processing logic, and one or more memories) or a combination of hardware and software.

As shown in FIG. 3, PFE 215 may include a port aggregator 300 and a packet forwarder 310. Port aggregator 300 may include hardware or a combination of hardware and software to bundle multiple physical ports together. Aggregation of multiple ports may allow the bandwidth of multiple links to be combined into one virtual aggregate interface.

Over-subscription of port aggregator 300 may provide a common solution for utilizing otherwise unused bandwidth through network device 200/PFE 215. A known number of oversubscribing ports (e.g., on the ingress side) may be assigned to one or more oversubscribed ports (e.g., on the egress side) to account for the bursty nature of typical communications over the oversubscribing ports. Typically, the actual data bandwidth of the oversubscribing ports is well below the processing capacity of port aggregator 300, allowing for oversubscribed ports to be implemented within PFE 215. In circumstances where the aggregate bandwidth of the oversubscribing ports exceeds the processing capacity of port aggregator 300, oversubscription logic may be implemented to guarantee minimum QoS and assure fair treatment of all users when congestion does occur. While four oversubscribing ports and two oversubscribed ports are shown in FIG. 3, different amounts and ratios of oversubscribing ports and oversubscribed ports may be used.

Packet forwarder 310 may include hardware or a combination of hardware and software that may perform further processing on the packets. For example, packet forwarder 310 may conduct a route lookup for each packet and decide how to forward it. Packet forwarder 310 may also determine if services are configured for the packet and forward the packet to a services interface.

Although FIG. 3 illustrates exemplary components of PFE 215, in other implementations, PFE 215 may include fewer, different, differently arranged, or additional functional components than those depicted in FIG. 3. Additionally, or alternatively, one or more operations described as being performed by a particular component may be performed by one or more other components, in addition to or instead of the particular component.

Figure 4:
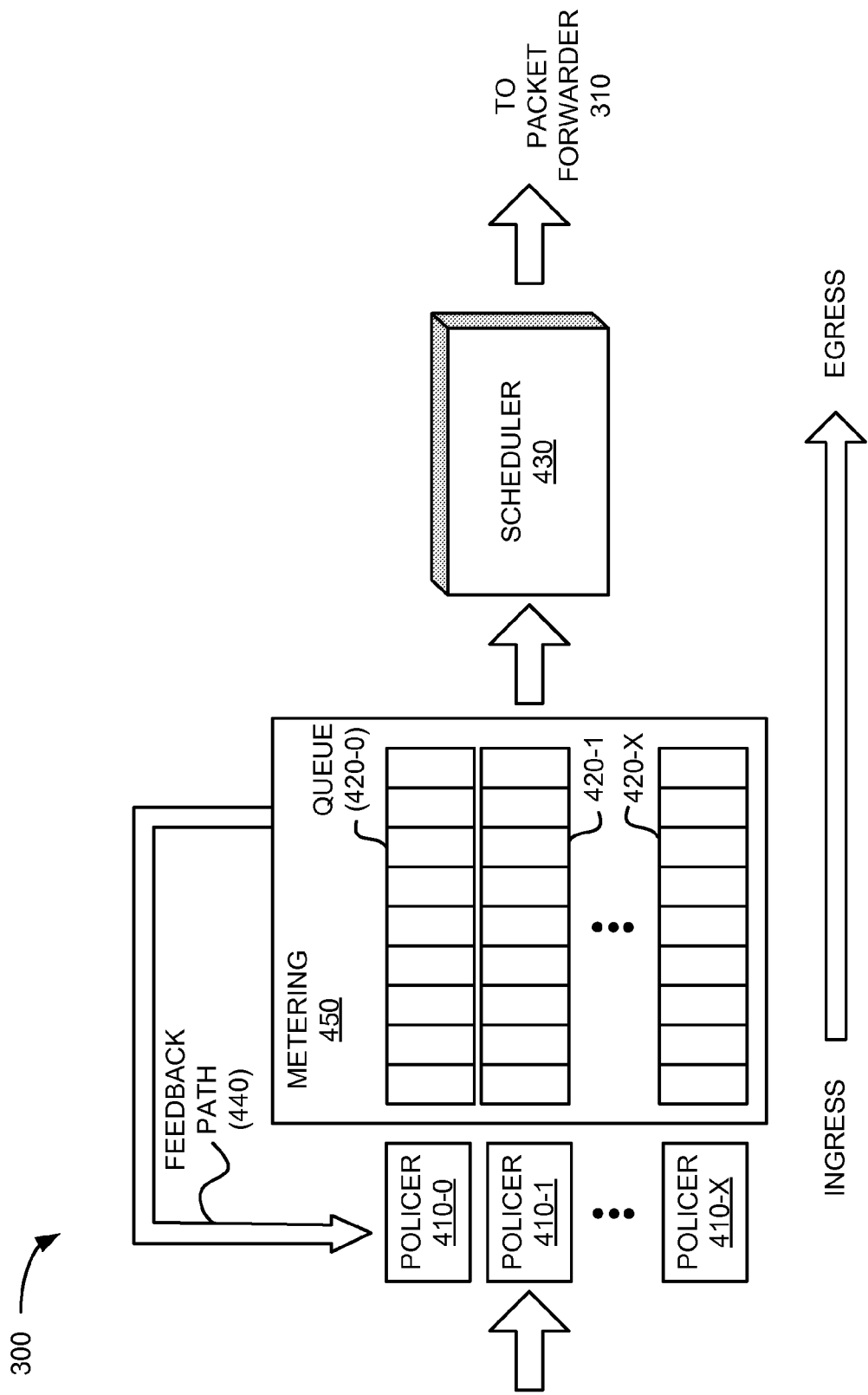
FIG. 4 is a diagram illustrating exemplary components of a port aggregator depicted in FIG. 3 in one implementation.

FIG. 4 is a diagram illustrating exemplary components of port aggregator 300 depicted in FIG. 3. As shown in FIG. 4, port aggregator 300 may include policers 410-0 through 410-X (collectively referred to as policers 410), ingress queues 420-0 through 420-X (collectively referred to as ingress queues 420), and a scheduler 430.

Policers 410 may include a filtering component used to limit traffic of a certain class to a specified bandwidth and/or burst size. Packets exceeding limits for policer 410 can be discarded, or can be assigned to a different forwarding class and/or a different loss priority. In implementations described herein, limits for policer 410 may be dynamically adjusted based on feedback, via feedback path 440, from each of queues 420. While shown in FIG. 4 as associated with an input interface of port aggregator 300, in other implementations policers 410 may be associated with input or output interfaces. Also, although policers 410 are described herein as operating on packets, more generally, the techniques described herein may be applied to frames, cells, or other data units in a network device. Additionally, instead of receiving a complete packet at policer 410, policer 410 may only receive a header of the packet, a portion of the header of the packet, or some other data structure relating to the header of the packet. In this situation, the remainder of the packet may be stored in a different memory and then combined with an appropriate header before being transmitted.

Queues 420 may store packets (or pointers to packets) that are filtered by policers 410. One or more queues 420 may be assigned to each of the over-subscribed egress ports of port aggregator 300. The number of packets in each of queues 420 may vary depending, for example, on the ingress traffic allowed by policers 410 for each queue and by the available bandwidth of the oversubscribed port from scheduler 430.

Scheduler 430 may assign the packets from queues 420 to an appropriate egress port. For example, scheduler 430 may process packets based on a weighted round robin (WRR) or other scheduling scheme. In an oversubscription scenario, the bandwidth of input ports feeding into queues 420 may exceed available bandwidth of the egress ports from scheduler 430.

In operation, policers 410 may be configured at all oversubscribing ingress ports matching traffic destined to individual queues 420 for the over-subscribed egress port. The configured rate for policers 410 may be a fine tunable oversubscription factor matching traffic destined to an individual queue 420 for all over-subscribing ports. The over-subscription factor may be equal to, lower than, or higher than the scheduler 430 bandwidth configured for the queue 420 at the over-subscribed port.

A metering function 450 within port aggregator 300 may monitor for impending port congestion at the egress ports by monitoring each of queues 420. Queues 420 for the oversubscribed port may be monitored for traffic beyond the bandwidth of configured scheduler 430. Once a particular queue 420 (e.g., queue 420-0) is identified as congested, feedback may be provided, e.g., via feedback path 440, to policers 410 (e.g., policers 410-0 through 410-X), for all the over-subscribing ingress ports corresponding to the over-subscribed egress port, to adjust the limits of the policers 410 at the over-subscribing ports. Policers 410 limits may be reduced by a particular percentage (e.g., to 80% of their current levels), but not to go below a minimum bandwidth required for QoS. Since policer limits on all the ingress ports are reduced as a percentage of an initial value, fairness is implicitly achieved during run time conditions as the ingress ports with higher traffic are likely to be limited more than the ingress ports with lighter traffic. Once the congestion in a particular queue 420 (e.g., queue 420-0) abates, limits for the policers 410 (e.g., policers 410-0 through 410-X) may be incrementally restored to the original configured values (e.g., in steps of 120% of the current values).

Figure 5:
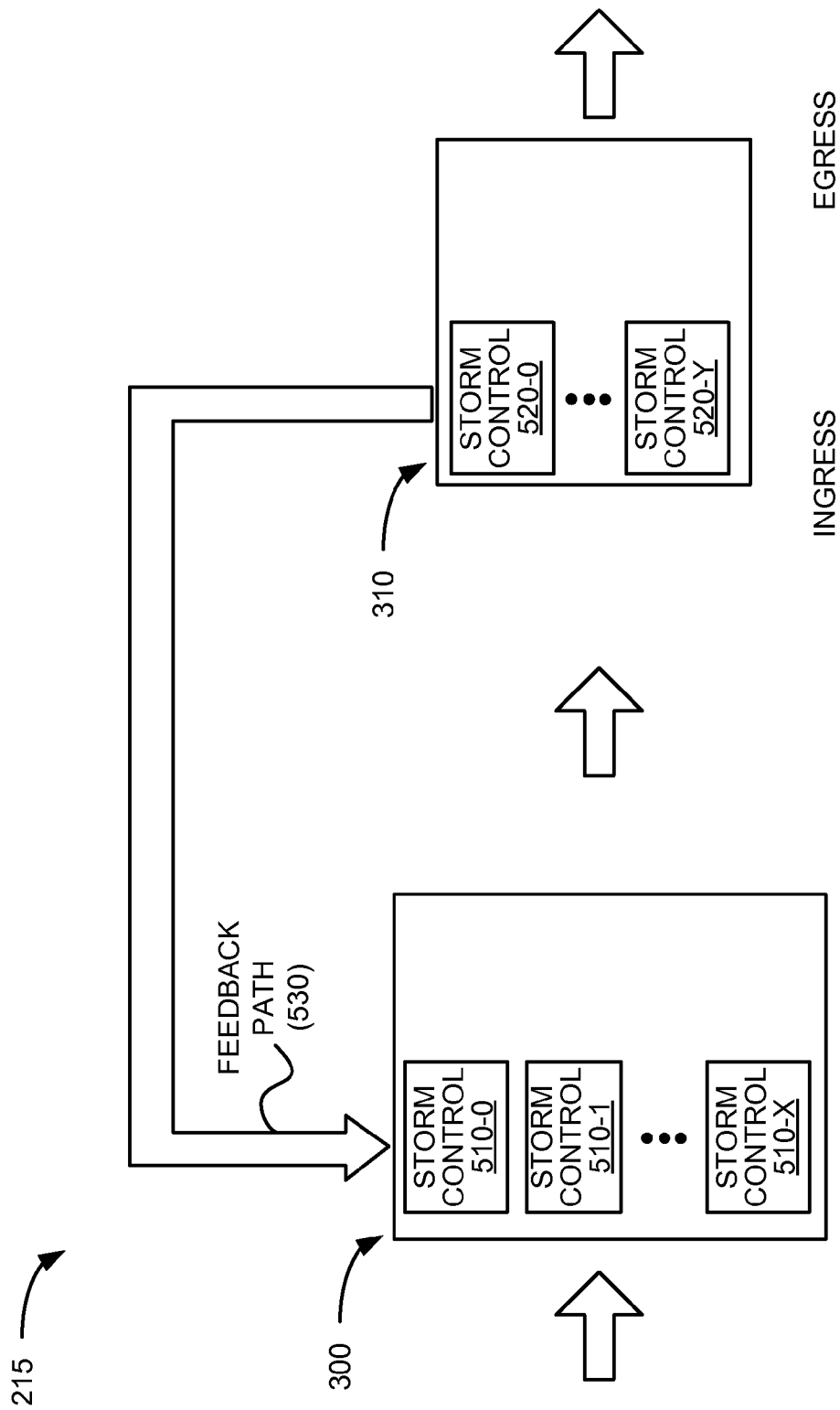
FIG. 5 is a diagram illustrating exemplary components of the port aggregator and packet forwarder depicted in FIG. 3 in another implementation.

FIG. 5 is another diagram exemplary components of port aggregator 300 and packet forwarder 310 depicted in FIG. 3 in another implementation. As shown in FIG. 5, port aggregator 300 may include over-subscribing ingress port storm controls 510-0 through 510-X (collectively referred to as aggregator storm controls 510) and packet forwarder 310 may include over-subscribed ingress port storm controls 520-0 through 520-Y (collectively referred to as forwarder storm controls 520).

Aggregator storm controls 510 and forwarder storm controls 520 may each include a filtering component used to limit the amount of multicast and broadcast traffic accepted and forwarded by a network device 200. Filters for aggregator storm controls 510 and forwarder storm controls 520 may be configured with storm control values based on initial monitoring or a set of default storm control values. Packets exceeding the storm control limits, for example, can be discarded, or can be assigned to a different forwarding class and/or a different loss priority. Storm control activity (e.g., a number of dropped packets) at forwarder storm controls 520 may be monitored and necessary adjustments for aggregator storm controls 510 may be communicated via feedback path 530.

In implementations described herein, forwarder storm controls 520 may be configured at a higher level than all of aggregator storm controls 510 by a particular fine-tunable over-subscription factor. The storm traffic level and/or number of dropped packets at forwarder storm controls 520 may be periodically monitored for persistent high multicast/broadcast/unknown unicast traffic threshold levels/drops. Once a monitored threshold level is exceeded in one of forwarder storm controls 520, feedback may be sent to the corresponding oversubscribing ingress ports to adjust the threshold levels of aggregator storm controls 510. Since storm control limits on all the ingress ports are reduced as a percentage of an initial value, fairness is implicitly achieved during run time conditions as the ingress ports with higher traffic are likely to be limited more than the ingress ports with lighter traffic.

Exemplary Processes

Figure 6:
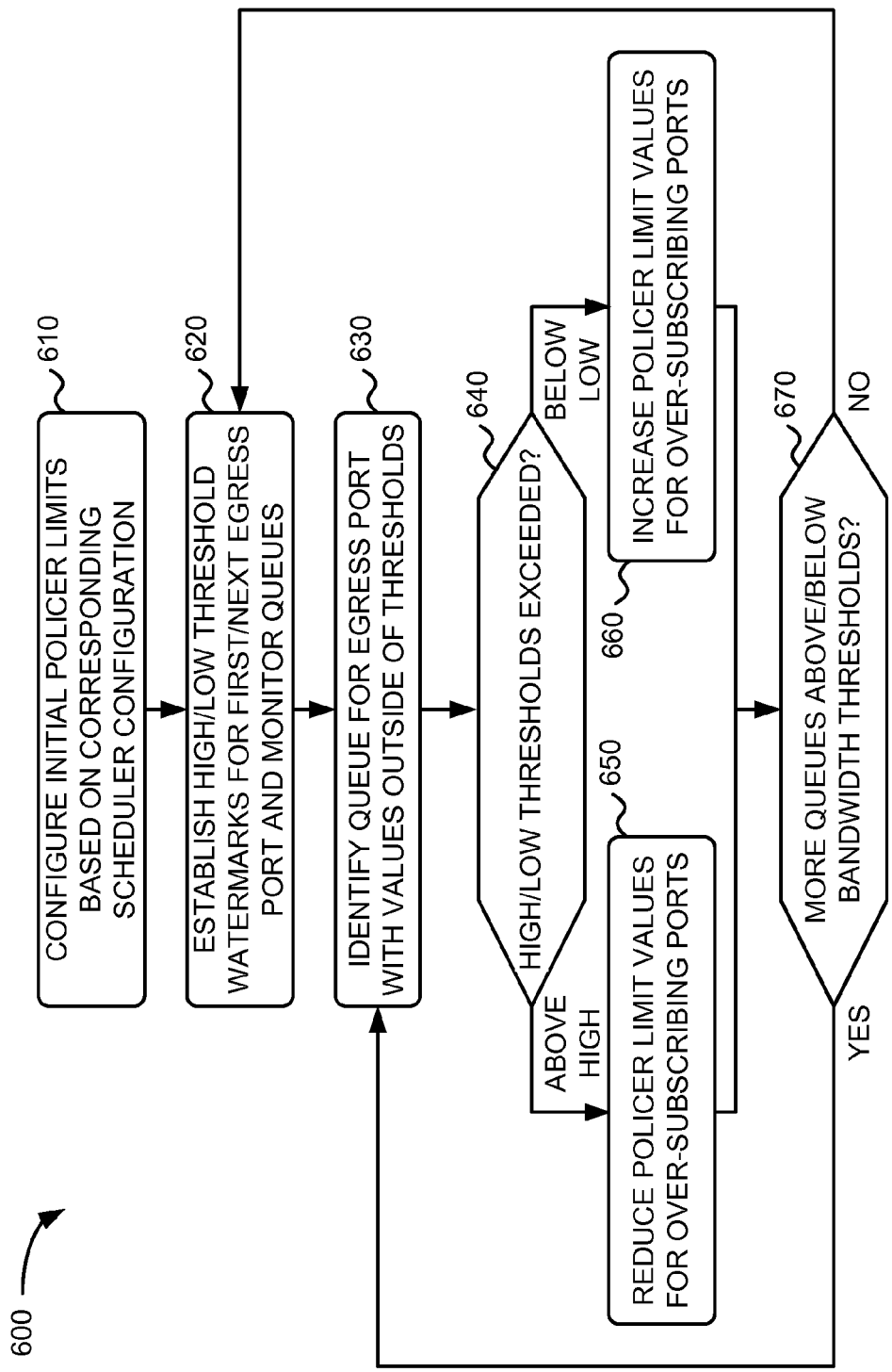
FIG. 6 is a flow diagram illustrating an exemplary process for implementing dynamic prioritized fair-share scheduling in an over-subscribed port environment.

FIG. 6 is a diagram illustrating an exemplary process 600 for implementing dynamic prioritized fair-share scheduling in an over-subscribed port environment. Process 600 may be performed by one or more components of network device 200. For example, port aggregator 300 of network device 200, as illustrated in FIGS. 3-5, and described herein, may perform one or more of the operations associated with process 600.

Process 600 may include configuring initial policer limits based on a corresponding scheduler configuration (block 610). For example, each of policers 410 may be configured to limit traffic of a certain class (e.g., voice, data, video, etc.) to a specified bandwidth and burst size. Packets exceeding the policer limits, for example, can be discarded, or can be assigned to a different forwarding class, a different loss priority, or both. Policer limits for traffic destined to each queue 420 may be based, for example, on the configuration of scheduler 430. In one implementation, the initial policer limits for each queue 420 may be equal to the scheduler 430 bandwidth configuration for each respective queue 420. In other implementations, the policer limits for each queue may be lower or higher than the scheduler 430 bandwidth configuration for each respective queue 420. In one implementation, policer limits may be configured automatically based on user input for scheduler 430. In another implementation, policer limits may be configured based on direct user input for queues 420.

High and low threshold watermarks may be established for the egress port and the queues being monitored (block 620), queues for the egress port with values outside the thresholds may be identified (block 630), and it may be determined which of the thresholds is exceeded (block 640). For example, port aggregator 300 (e.g., monitor 450) may periodically monitor for persistent high/low bandwidth watermark levels at the over-subscribed ports. In one implementation, monitor 450 may monitor for persistent impending port congestion watermark traffic levels (e.g., a number of queued packets or another measure of queue volume) in each individual queue 420. Persistence may be determined, for example, when the same condition occurs over 'N' consecutive samples (where 'N' is an integer greater than 1 and may be fine-tunable). A particular queue 420 (e.g., queue 420-0) may be identified as having values below or above one of the thresholds.

If it is determined that the high threshold is exceeded (block 640—ABOVE HIGH), the policer limit values for the over-subscribing ports may be reduced (block 650). For example, port aggregator 300 may determine the traffic levels of ingress ports (e.g., using metering 450 functionality) feeding in to a particular queue (e.g., queue 420-0) are above a high watermark threshold. Once a congested queue (e.g., queue 420-0) is identified, port aggregator 300 may change the policer limits for all of the over-subscribing ports to a lesser value (e.g., 80% or another lesser value of the current levels). In another implementation, port aggregator 300 may apply a configurable factor to adjust the rate of change of the policer limits. For example, the rate of decrease of the policer limits may be based on the particular port or queue priority (e.g., the priority of the traffic assigned to a particular queue that has exceeded the high threshold watermark). That is, when the high threshold is exceeded by a high priority queue the rate of decrease may be different (e.g., lower) than the rate of decrease when the high threshold is exceeded by a lower priority queue. As another example, the rate of decrease of the policer limits may be based on the over-subscription factor (e.g., ratio of the total bandwidth of the over-subscribed port and the over-subscribing ports).

If it is determined that the low threshold is exceeded (block 640—BELOW LOW), the policer limit values for the over-subscribing ports may be increased (block 660). For example, port aggregator 300 may determine the traffic levels of ingress ports (e.g., using metering 450 functionality) feeding in to a particular queue (e.g., queue 420-1) are below a low watermark threshold. Once the uncongested queue (e.g., queue 420-1) is identified, port aggregator 300 may change the policer limits for all of the over-subscribing port to a higher value (e.g., 120% or another greater value of the current level). In another implementation, port aggregator 300 may apply a configurable factor to adjust the rate of change of the policer limits. For example, the rate of increase of the policer limits may be based on the particular port or queue priority (e.g., the priority of the traffic assigned to a particular queue that has dropped below the low threshold watermark). That is, when a high priority queue drops below a low threshold, the rate of increase may be different (e.g., higher) than the rate of increase when the low threshold is reached by a lower priority queue. As another example, the rate of increase of the policer limits may be based on an over-subscription factor (e.g., ratio of the total bandwidth of the over-subscribed port and the over-subscribing ports).

It may be determined if there are additional queues above or below the bandwidth thresholds (block 670). For example, metering 450 functionality within port aggregator 300 may identify additional queues 420 with traffic levels above the respective high watermark level or below the respective low watermark level. If it is determined that there are additional queues above or below the bandwidth thresholds (block 670—YES), process 600 may return to block 630.

If it is determined that there are no additional queues above or below the bandwidth thresholds (block 670—NO), process 600 may return to block 620 to establish threshold watermarks at another egress port (if necessary) and monitor the queues for that port. For example, port aggregator 300 may monitor queues 420 for another over-subscribed port and adjust the policer limits on each of the ingress ports to ensure all flows get a minimum guaranteed fair share based on the priority of the flow taking care to ensure that the rate-limits are adjusted factoring to exploit the oversubscription.

Figure 7:
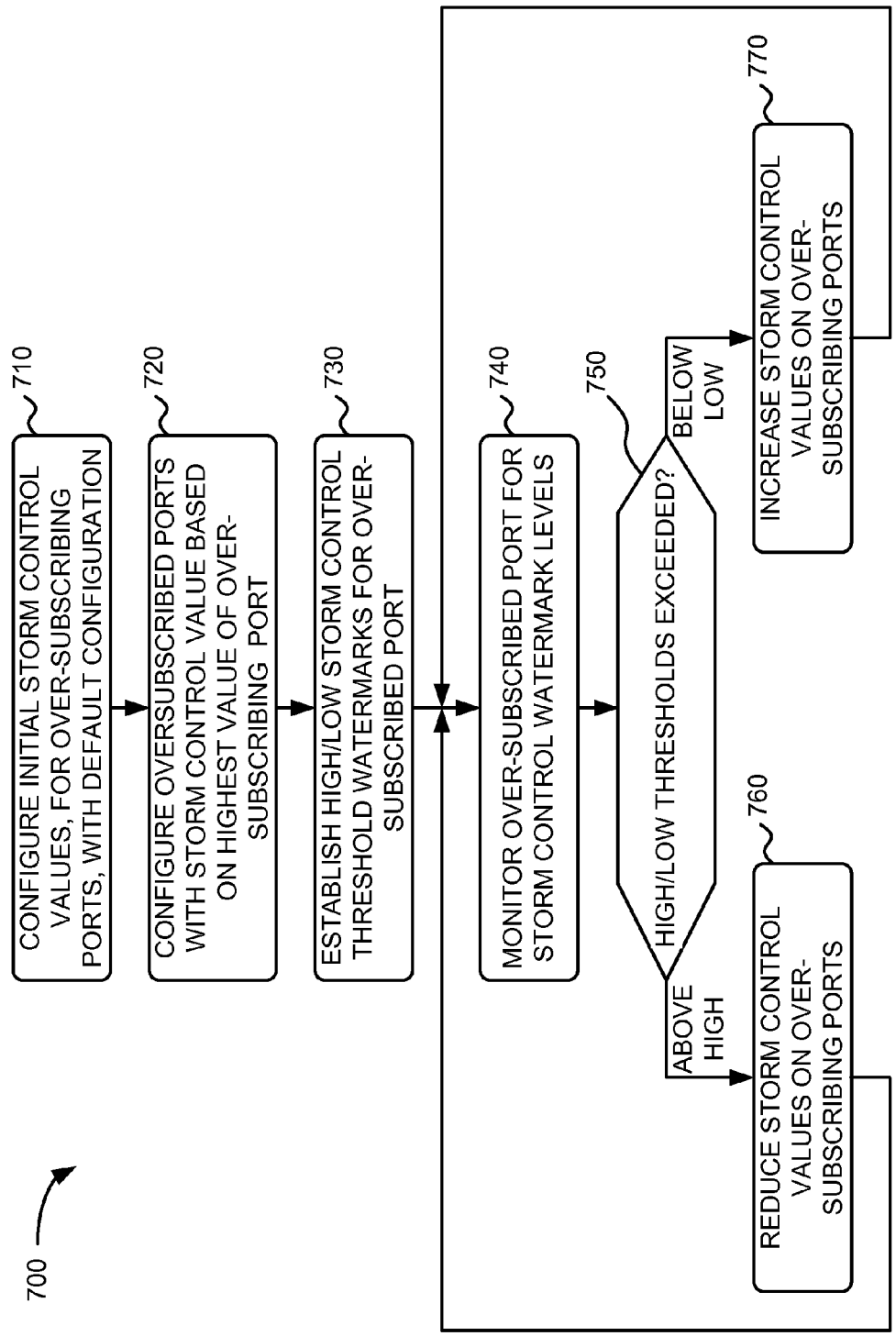
FIG. 7 is a flow diagram illustrating an exemplary process for implementing dynamic storm control in an over-subscribed port environment.

FIG. 7 is a diagram illustrating an exemplary process 700 for implementing storm control in an over-subscribed port environment. Process 700 may be performed by one or more components of PFE 215. For example, port aggregator 300 and packet forwarder 310 of PFE 215, as illustrated in FIGS. 2-5, and described herein, may perform the operations associated with process 700.

Process 700 may include configuring initial storm control values, for the over-subscribing ports, with a default configuration (block 710). For example, values for aggregator storm controls 510 may be determined based on initial monitoring or a set of default storm control values. Packets exceeding the storm control limits, for example, can be discarded, or can be assigned to a different forwarding class, a different loss priority, or both. In an exemplary implementation, a network administrator may monitor the percentage of broadcast and unknown unicast traffic in a LAN associated with network device 200 when the LAN is operating normally. The "normal" data can then be used as a benchmark to determine when traffic levels are too high. The values aggregator storm controls 510 can then be used to set the levels, for the over-subscribing ports, at which to drop broadcast traffic, unknown unicast traffic, or both.

An over-subscribed port may be configured with a storm control value based on the highest storm control value of the over-subscribing ports (block 720). For example, port aggregator 300 may find the highest value of aggregator storm controls 510 among the oversubscribing ports. Port aggregator 300 may multiply that highest value by an over-subscribed storm control factor to determine a value for over-subscribed forwarder storm control 520. Port aggregator 300 may then configure the over-subscribed port with the over-subscribed storm control value. The over-subscribed storm control factor may be a fine-tunable value determined, for example, based on the ratio of the total bandwidth of the over-subscribed port and the over-subscribing ports.

High and low storm control threshold watermarks may be established for the over-subscribed port (block 730). For example, PFE 215 (e.g., port aggregator 300 and/or packet forwarder 310) may calculate the high threshold watermark between the highest value of an over-subscribing storm control value and the over-subscribed port storm control value. In other words, PFE 215 may establish the high threshold watermark at a mid-point (or other intermediate value) between the highest aggregator storm controls 510 value of the oversubscribing ports and the over-subscribed port forwarder storm control 520 value. PFE 215 may establish the low threshold watermark for forwarder storm control 520 at, for example, eighty percent (80%) of the lowest value of the aggregator storm controls 510 values among the over-subscribing ports.

The over-subscribed port may be monitored for high/low storm control watermark levels (block 740) and it may be determined which of the thresholds is exceeded (block 750). For example, packet forwarder 310 may periodically monitor for persistent high/low bandwidth watermark levels of broadcast traffic and/or unknown unicast traffic at the over-subscribed port. Persistence may be determined, for example, when the same condition occurs over 'N' consecutive samples (where 'N' is an integer greater than 1 and may be fine-tunable).

If it is determined that the high storm control watermark is exceeded (block 750—ABOVE HIGH), the aggregator storm controls 510 values of the over-subscribing ports may be reduced (block 760). For example, port aggregator 300 may determine the broadcast traffic and/or unknown unicast traffic levels the over-subscribed port are above a high watermark threshold. Port aggregator 300 may reduce the storm control values of the over-subscribing ports to a lower value, such as eighty percent (80%) of the current values. Process 700 may then return to process block 740.

If it is determined that the low storm control watermark is exceeded (block 750—BELOW LOW), the storm control values of the over-subscribing ports may be increased (block 770). For example, port aggregator 300 may determine that the broadcast traffic and/or unknown unicast traffic levels of the over-subscribed port are below a low watermark threshold. Port aggregator 300 may increase the storm control values of the over-subscribing ports to a higher value, such as one hundred twenty percent (120%) of the current values. The storm control settings may be limited to a maximum threshold of the originally configured values. Process 700 may then return to process block 740.

Conclusion

Implementations described herein may provide systems and/or methods that may receive initial flow rate control limits for a plurality of over-subscribing ingress ports, and may identify a high threshold watermark and a low threshold watermark for bandwidth usage of an over-subscribed ingress port associated with the plurality of over-subscribing ingress ports. The systems and/or methods may monitor bandwidth usage of the oversubscribed ingress port and may identify, based on the monitoring, bandwidth usage of the oversubscribed ingress port that is outside a range defined by the high threshold watermark or the low threshold watermark. The systems and/or methods may reduce the initial flow rate control limits for the plurality of over-subscribing ingress ports when the bandwidth usage of the oversubscribed ingress port is above the high threshold watermark, and may increase the initial flow rate control limits for the plurality of over-subscribing ingress ports when the bandwidth usage of the over-subscribed ingress port is below the low threshold watermark. Flow rate controls may include, for example, a policer and/or a storm control.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   configuring, by a network device, initial policer limits for a plurality of over-subscribing ingress ports based on bandwidth limits for an over-subscribed egress port associated with the plurality of over-subscribing ingress ports;
   obtaining, by the network device, a first threshold watermark and a second threshold watermark for bandwidth usage of the over-subscribed egress port,
      the first threshold watermark being higher than the second threshold watermark;
   identifying, by the network device, a queue, associated with the over-subscribed egress port, having a queue volume that is above the first threshold watermark or below the second threshold watermark over a particular quantity of consecutive samples;
   determining, by the network device, an oversubscription factor based on a ratio of a total bandwidth of the over-subscribed egress port and a total bandwidth of the plurality of over-subscribing ingress ports;
   determining, by the network device and when the queue volume is below the second threshold watermark over the particular quantity of consecutive samples, a rate of increase based on the oversubscription factor; and
   increasing, by the network device and when the queue volume is below the second threshold watermark over the particular quantity of consecutive samples, the initial policer limits to create increased policer limits based on the rate of increase, the initial policer limits being increased without having been previously decreased.

2. The method of claim 1, where identifying the queue comprises:
   monitoring traffic patterns through each of a plurality of queues associated with the over-subscribed egress port by comparing the traffic patterns with the first threshold watermark and the second threshold watermark,
      the plurality of queues including the queue.

3. The method of claim 2, where identifying the queue further comprises:
   identifying, based on the traffic patterns, the queue having the queue volume that is above the first threshold watermark or below the second threshold watermark over the particular quantity of consecutive samples.

4. The method of claim 1, further comprising:
   determining, when the queue volume is above the first threshold watermark over the particular quantity of consecutive samples, a rate of decrease based on the oversubscription factor; and
   reducing, based on the rate of decrease, the initial policer limits to a particular percentage of the initial policer limits to create reduced policer limits,
      where increasing the initial policer limits comprises:
         increasing the initial policer limits to a different percentage of the initial policer limits to create the increased policer limits.

5. The method of claim 1, further comprising:
   identifying that the queue volume is above the first threshold watermark; and
   reducing, based on identifying that the queue volume is above the first threshold watermark, the increased policer limits.

6. The method of claim 1, where the network device comprises one or more of:
   a gateway,
   a router,
   a switch,
   a firewall,
   a network interface card (NIC),
   a hub,
   a bridge,
   a proxy server, or
   an optical add-drop multiplexer (OADM).

7. A method comprising:
   receiving, by a network device, initial storm control limits for a plurality of over-subscribing ports;
   determining, by the network device, a highest value of the initial storm control limits;
   determining, by the network device, a particular value by multiplying the highest value by a factor,
      the factor being based on a ratio of a total bandwidth of an over-subscribed port and a total bandwidth of the plurality of over-subscribing ports;
   configuring, by the network device, a storm control limit for the over-subscribed port based on the particular value;
   establishing, by the network device and based on the storm control limit, a first threshold watermark and a second threshold watermark for storms of the over-subscribed port,
      the first threshold watermark being higher than the second threshold watermark;
   identifying, by the network device, a storm value, associated with the over-subscribed port, that is below the second threshold watermark over a particular quantity of consecutive samples; and
   increasing, by the network device and when the storm value is below the second threshold watermark over the particular quantity of consecutive samples, the initial storm control limits to create increased storm control limits for the plurality of over-subscribing ports,
the initial storm control limits being increased without having been previously decreased.

8. The method of claim 7, where establishing the first threshold watermark and the second threshold watermark comprises:
setting the first threshold watermark at a value between the highest value of the initial storm control limits and the storm control limit for the over-subscribed port, and
setting the second threshold watermark at a particular percentage of a lowest value of the initial storm control limits.

9. The method of claim 7,
where the initial storm control limits are associated with a port aggregator, and
where the storm control limit is associated with a packet forwarder.

10. A network device comprising:
one or more processors to:
configure policer limits for a plurality of over-subscribing ingress ports based on bandwidth limits for an over-subscribed egress port associated with the plurality of over-subscribing ingress ports;
identify a queue, associated with the over-subscribed egress port, with a queue volume that is, over a particular quantity of consecutive samples, above a first threshold watermark for bandwidth usage or below a second threshold watermark for bandwidth usage,
the first threshold watermark being higher than the second threshold watermark;
determine an oversubscription factor based on a ratio of a total bandwidth of the over-subscribed egress port and a total bandwidth of the plurality of over-subscribing ingress ports;
determine, when the queue volume is below the second threshold watermark over the particular quantity of consecutive samples, a rate of increase based on the oversubscription factor; and
increase the policer limits based on the rate of increase when the queue volume is below the second threshold watermark,
the policer limits being increased without having been previously decreased.

11. The network device of claim 10, where, when identifying the queue, the one or more processors are to:
monitor traffic patterns of a plurality of queues associated with the over-subscribed egress port,
the plurality of queues including the queue, and
identify the queue based on the traffic patterns.

12. The network device of claim 10,
where the one or more processors are further to:
reduce, when the queue volume is above the first threshold watermark and based on the oversubscription factor, the policer limits to a first particular percentage of the policer limits to create reduced policer limits for the plurality of over-subscribing ingress ports, and
where, when increasing the policer limits, the one or more processors are to:
increase the policer limits to a second particular percentage of the policer limits to create increased policer limits for the plurality of over-subscribing ingress ports.

13. The network device of claim 10, where the one or more processors are to:
reduce, when the queue volume is above the first threshold watermark and based on the oversubscription factor, a particular policer limit, of the policer limits, to a minimum limit that is based on a required quality of service (QoS).

14. A network device comprising:
one or more processors to:
receive initial storm control limits for a plurality of over-subscribing ports;
determine a highest value of the initial storm control limits;
determine a particular value by multiplying the highest value by a factor,
the factor being based on a ratio of a total bandwidth of an over-subscribed port and a total bandwidth of the plurality of over-subscribing ports;
configure a storm control limit for the over-subscribed port based on the particular value;
establish, based on the storm control limit, a first threshold watermark and a second threshold watermark for storms of the over-subscribed port;
identify storm values, associated with the over-subscribed port, that are, over a particular quantity of consecutive samples, above the first threshold watermark or below the second threshold watermark; and
increase the initial storm control limits, to create increased storm control limits for the plurality of over-subscribing ports, when the storm values associated with the over-subscribed port are below the second threshold watermark over the particular quantity of consecutive samples,
the initial storm control limits being increased without having been previously decreased.

15. The network device of claim 14, where, when establishing the first threshold watermark, the one or more processors are to:
set the first threshold watermark at a value between the highest value and the storm control limit, and
set the second threshold watermark at a particular percentage of a lowest value of the initial storm control limits.

16. The network device of claim 14, where the one or more processors are further to:
monitor for changes in the storm values, and
adjust the increased storm control limits based on the changes.

17. A system comprising:
one or more devices to:
receive flow rate control limits for a plurality of over-subscribing ports;
identify a particular threshold watermark for bandwidth usage of an over-subscribed port associated with the plurality of over-subscribing ports;
determine that a bandwidth usage of the oversubscribed port is below the particular threshold watermark over a particular quantity of consecutive samples;
determine an oversubscription factor based on a ratio of a total bandwidth of the over-subscribed port;
determine, after determining that the bandwidth usage of the over-subscribed port is below the particular threshold watermark, a rate of increase based on the oversubscription factor; and
increase the flow rate control limits based on the rate of increase to obtain increased flow rate control limits,
the flow rate control limits being increased without having been previously decreased.

18. The system of claim 17, where the flow rate control limits include:
   policer limits, or
   storm control limits.

19. The system of claim 17, where the one or more devices are further to:
   determine that the bandwidth usage of the over-subscribed port is below another threshold watermark;
   determine a priority of traffic assigned to a queue associated with the bandwidth usage of the over-subscribed port; and
   determine a rate of decrease based on the priority of traffic after determining that the bandwidth usage of the over-subscribed port is below the other threshold watermark.

20. The system of claim 19, where the rate of decrease is lower than a different rate of decrease associated with a different queue that is assigned a different priority of traffic.

* * * * *